US006860459B2

(12) United States Patent
Lyman et al.

(10) Patent No.: US 6,860,459 B2
(45) Date of Patent: Mar. 1, 2005

(54) METHOD AND APPARATUS FOR MOUNTING SELECTIVELY ORIENTABLE COMPONENT

(75) Inventors: Stephen R. Lyman, Hudson, NH (US); Benjamin Beck, Boston, MA (US); Douglas A. Marsden, Marblehead, MA (US)

(73) Assignee: GN Netcom, Inc., Nashua, NH (US)

( * ) Notice: Subject to any disclaimer, the term of this patent is extended or adjusted under 35 U.S.C. 154(b) by 0 days.

(21) Appl. No.: 10/207,536

(22) Filed: Jul. 29, 2002

(65) Prior Publication Data

US 2004/0016862 A1 Jan. 29, 2004

(51) Int. Cl.⁷ .............................................. F16M 13/00
(52) U.S. Cl. ................. 248/558; 248/316.1; 248/349.1; 248/231.81; 248/912
(58) Field of Search ........................... 248/558, 231.71, 248/231.81, 224.51, 205.3, 309.1, 316.1, 311.2, 349.1, 284.1, 291.1, 912, 911

(56) References Cited

U.S. PATENT DOCUMENTS

| | | | | |
|---|---|---|---|---|
| 820,596 A | * | 5/1906 | Norwood ...................... 225/38 |
| 2,841,311 A | * | 7/1958 | Parizek ...................... 222/181.2 |
| 3,536,284 A | * | 10/1970 | Chickering, Jr. .......... 248/183.1 |
| 3,794,181 A | * | 2/1974 | Canham ...................... 211/65 |
| 3,799,466 A | * | 3/1974 | Adams ...................... 242/596.3 |
| 4,278,225 A | * | 7/1981 | Phelps ...................... 248/311.3 |
| D265,508 S | * | 7/1982 | Rusteberg .................. D24/128 |
| 4,832,299 A | * | 5/1989 | Gorton et al. .......... 248/231.71 |
| 5,259,519 A | * | 11/1993 | Lieberman .................... 211/66 |
| 5,290,005 A | * | 3/1994 | Akiyama et al. ............ 248/671 |
| 5,320,311 A | * | 6/1994 | Jensen et al. .............. 248/27.1 |
| 5,605,304 A | * | 2/1997 | Ahern, Jr. .................... 242/588 |
| 5,699,943 A | * | 12/1997 | Schaefer et al. ............ 224/197 |
| 5,758,853 A | * | 6/1998 | Perrin et al. .............. 248/311.2 |
| D409,027 S | * | 5/1999 | Simhaee ...................... D6/518 |
| 6,056,132 A | * | 5/2000 | Becker et al. .............. 211/164 |
| 6,056,175 A | * | 5/2000 | Mieglitz et al. ............ 224/282 |
| 6,113,047 A | * | 9/2000 | Wung et al. .............. 248/284.1 |
| 6,450,380 B1 | * | 9/2002 | Simhaee ...................... 225/46 |
| 6,695,269 B1 | * | 2/2004 | Anscher ................ 248/225.11 |
| 2002/0124355 A1 | * | 9/2002 | Schmidt et al. .............. 24/3.12 |

* cited by examiner

Primary Examiner—Leslie A. Braun
Assistant Examiner—Naschica S. Morrison
(74) Attorney, Agent, or Firm—Altera Law Group, LLC (57) ABSTRACT

A method and apparatus for mounting a component using a mounting accessory is disclosed herein. The mounting accessory and the component are designed and configured to provide a variety of different mounting methods, as required by the environment. The component and the mounting accessory are designed to provide a variety of mated relationships therebetween. The component makes contact with the mounting accessory in at least two locations or contact points to provide a secure attachment that is easily changeable to provide a desired orientation. Connecting the component to the mounting accessory is carried out with at least two mated attachment points, a portion of the component is received into an orifice of the mounting accessory and a portion of the mounting accessory is received into an orifice of the component. Once mounted within the accessory in an initial orientation, the orientation of the component within the accessory is changeable without removal of the component from the accessory to conveniently place button on the component with reach of a user.

6 Claims, 10 Drawing Sheets

METHOD AND APPARATUS FOR MOUNTING SELECTIVELY ORIENTABLE COMPONENT

BACKGROUND OF THE INVENTION

1. Field of the Invention

This invention relates, in general, to mounting of electrical components and equipment, and more particularly, to a method and apparatus for mounting a component using a mounting accessory and wherein the mounting accessory and the component are designed and configured to provide a variety of different mounting methods, as required by the environment, and a variety of mated relationships between the mounting accessory and the component and further wherein the orientation of the component within the mounting accessory is changeable without removal of the component from within the mounting accessory.

2. Description of Related Art

As computers and electronic devices become more powerful, users desire to exploit this power by performing increasingly complex and numerous inputs and outputs. Input ports may be needed in places distant from the computer CPU or closer to the user than otherwise provided for by the computer manufacturer. Often, it is desirable to provide an electrical component that can be mounted nearer a user, wherein the user may conveniently change the device being accessed by simply pushing a button. The location nearer the user may be a horizontal, vertical or obtuse mount. It is desirable to provide a mounting structure that permits selective orientation of a component within the mounting accessory without removal of the component from the mounting accessory conveniently placing the buttons of the component within reach of a user and normal readable orientation of the user.

It can be seen that there is a need for a method and apparatus for selectively mounting a component using a mounting accessory and wherein the mounting accessory and the component are designed and configured to provide a variety of different mounting methods, as required by the environment and a variety of mated relationships between the mounting accessory and the component and further wherein the orientation of the component within the mounting accessory is changeable without removal of the component from within the mounting accessory.

SUMMARY OF THE INVENTION

To overcome the limitations in the prior art, and to overcome other limitations that will become apparent upon reading and understanding the present specification, the present invention discloses mounting of electrical components and equipment, and more particularly, a method and apparatus for mounting a component using a mounting accessory, wherein the mounting accessory and the component are designed and configured to provide a variety of different mounting methods, as required by the environment and a variety of mating relationships between the mounting accessory and the component and further wherein the orientation of the component within the mounting accessory is changeable without removal of the component from within the mounting accessory.

The present invention solves the above-described problems by providing a method and apparatus for mounting a component using a mounting accessory. The mounting accessory and the component are designed and configured to provide a variety of different mounting methods, as required by the environment. The component and the mounting accessory are designed to provide a variety of mating relationships therebetween.

The component makes contact with the mounting accessory in at least two locations or contact points to provide a secure attachment that is easily releasable to provide desired maintenance. Connecting the component to the mounting accessory is carried out with at least two mating attachment points where a portion of the component is received into an orifice of the mounting accessory and a portion of the mounting accessory is received into an orifice of the component. Once the component is mounted into the mounting accessory in an initial orientation, the orientation is changeable without removal of the component from within the mounting accessory.

An apparatus according to an embodiment of the present invention includes an accessory for mounting a component in a plurality of selective orientations, the accessory including an orifice disposed at an end of the accessory for receiving a protruding extension of the component and a protrusion disposed at an opposing end of the accessory receivable into a depression in the component, wherein the component is securable between the orifice and the protrusion.

Another aspect of the present invention is that the orifice is disposed in a flange bracket and the protrusion is disposed on an arm, the flange bracket and the arm are generally parallel to one another, and the flange bracket and the arm cooperate to resiliently and frictionally retain the component therebetween.

Another aspect of the present invention is that the orifice has a plurality of edge surfaces forming an interior of the orifice and the protruding extension of the component has a plurality of edge surfaces forming an exterior of the protruding extension, wherein at least fraction of a number of the plurality of edge surfaces of the protruding extension engage at least half of the edge surfaces of the orifice to facilitate mounting of the component into the accessory in a plurality of selectable orientations.

Another aspect of the present invention is that the orientation of the component within the accessory is changeable without removal of the component from the accessory.

Another aspect of the present invention is that the protrusion has a shape that corresponds to a shape of the depression of the component and facilitates mating engagement of the component into the accessory in a plurality of orientations.

Another aspect of the present invention is that the orifice is generally square shaped and has four beveled flanges forming an interior of the orifice.

Another aspect of the present invention is that the protrusion is generally hemispherical shaped.

Another aspect of the present invention is that the accessory is provided with a plurality of holes for receiving a plurality of screws to attach the accessory to a surface.

Another aspect of the present invention is that the accessory has a lower face having a double-sided sticky pad applied thereon to attach the accessory to a surface.

Another aspect of the present invention is that the accessory has a lower face and the lower face has at least one non-slip element attached to the lower face to secure the accessory to a surface.

Another apparatus according to an embodiment of the present invention includes an accessory for mounting a component in a plurality of selective orientations, the accessory including a flange bracket having an orifice at one end of the accessory and an arm having a protrusion at another end of the accessory, the flange bracket and the arm are generally parallel to one another, wherein the flange bracket and the arm cooperate to retain the component therebetween, the flange bracket and the arm are capable of mating with respective portions of the component in a plurality of selective orientations.

Another aspect of the present invention is that the flange bracket and the arm cooperate to resiliently and frictionally retain the component therebetween and the orientation of the component within the accessory is changeable without removal of the component from the accessory.

Another aspect of the present invention is that the orifice has a plurality of edge surfaces forming an interior of the orifice and the protruding extension of the component has a plurality of edge surfaces forming an exterior of the protruding extension, wherein at least fraction of a number of the plurality of edge surfaces of the protruding extension engage at least half of the edge surfaces of the orifice to facilitate mounting of the component into the accessory in a plurality of selectable orientations.

Another aspect of the present invention is that the protrusion has a shape that corresponds to a shape of a depression in the component and facilitates mating engagement of the component into the accessory in a plurality of orientations.

Another aspect of the present invention is that the orifice is generally square shaped and has four beveled flanges forming an interior of the orifice.

Another aspect of the present invention is that the protrusion is generally hemispherical shaped.

Another aspect of the present invention is that the accessory is provided with a plurality of holes for receiving a plurality of screws to attach the accessory to a surface.

Another aspect of the present invention is that the accessory has a lower face having a double-sided sticky pad applied thereon to attach the accessory to a surface.

Another aspect of the present invention is that the accessory has a lower face and the lower face has at least one non-slip element attached to the lower face to secure the accessory to a surface.

A system in accordance with the principles of the present invention includes a system for mounting a component in a plurality of selective orientations, the system including an accessory having an orifice and a protrusion; and the component having a protruding extension and a depression, wherein the protruding extension is received into the orifice and the protrusion is received into the depression to secure the component to the accessory.

Another aspect of the present invention is that the orifice is disposed in a flange bracket and the protrusion is disposed on an arm, the flange bracket and the arm are generally parallel to one another, and the flange bracket and the arm cooperate to resiliently and frictionally retain the component therebetween.

Another aspect of the present invention is that the orifice has a plurality of edge surfaces forming an interior of the orifice and the protruding extension of the component has a plurality of edge surfaces forming an exterior of the protruding extension, wherein at least fraction of a number of the plurality of edge surfaces of the protruding extension engage at least half of the edge surfaces of the orifice to facilitate mounting of the component into the accessory in a plurality of selectable orientations and the depression has a shape which corresponds to a shape of the protrusion, and further wherein the protruding extension, the orifice, the depression and the protrusion cooperate respectively to facilitate mating engagement of the component into the accessory in a plurality of orientations.

Another aspect of the present invention is that the component is resiliently and frictionally maintained in an orientation within the accessory, and further wherein the orientation of the component within the accessory may be changed without removal of the component from the accessory.

Another aspect of the present invention is that the orifice is generally square shaped and has four beveled flanges forming an interior of the orifice and the protruding extension has beveled flanges numbering a multiple of four forming an exterior of the protruding extension and further wherein the interior of the orifice and the and four of the beveled flanges forming the exterior of the protruding extension resiliently mate together in a plurality of orientations.

Another aspect of the present invention is that the protrusion is generally hemispherical shaped and the depression is generally hemispherical shaped and wherein the protrusion and the depression resiliently mate together in a plurality of orientations.

Another aspect of the present invention is that the accessory is provided with a plurality of holes for receiving a plurality of screws to attach the accessory to a surface.

Another aspect of the present invention is that the accessory has a lower face having a double-sided sticky pad applied thereon to attach the accessory to a surface.

Another aspect of the present invention is that the accessory has a lower face and the lower face has at least one non-slip element attached to the lower face to secure the accessory to a surface.

Another system in accordance with the principles of the present invention includes a system for mounting a component in a plurality of selective orientations, the system including an accessory having an upper face, the upper face having an arm disposed perpendicular to the upper face at a first end and a flange bracket disposed perpendicular to the upper face at a second end, the arm and the flange bracket are generally parallel to one another, the flange bracket having an orifice disposed therein and the arm having a protrusion disposed thereon and the component having a protruding extension disposed on a rear end and a depression disposed on a front end, wherein the orifice of the accessory receives the protruding extension of the component therein and the depression of the component receives the protrusion of the accessory therein to mount the component within the accessory in a selected orientation.

Another aspect of the present invention is that the orientation of the component within the accessory is changeable without removal of the component from the accessory.

Another aspect of the present invention is that the flange bracket and the arm resiliently and frictionally retain the component therebetween.

Another aspect of the present invention is that the orifice has a plurality of edge surfaces forming an interior of the orifice and the protruding extension of the component has a plurality of edge surfaces forming an exterior of the protruding extension, wherein at least fraction of a number of the plurality of edge surfaces of the protruding extension engage at least half of the edge surfaces of the orifice to facilitate mounting of the component into the accessory in a plurality of selectable orientations and the depression has a shape which corresponds to a shape of the protrusion, and further wherein the protruding extension, the orifice, the depression and the protrusion cooperate respectively to facilitate mating engagement of the component into the accessory in a plurality of orientations.

Another aspect of the present invention is that the orifice is generally square shaped and has four beveled flanges forming an interior of the orifice and the protruding extension has beveled flanges numbering a multiple of four forming an exterior of the protruding extension and further wherein the interior of the orifice and the and four of the beveled flanges forming the exterior of the protruding extension resiliently mate together in a plurality of orientations.

Another aspect of the present invention is that the protrusion is generally hemispherical shaped and the depression is generally hemispherical shaped and wherein the protrusion and the depression resiliently mate together in a plurality of orientations.

Another aspect of the present invention is that the accessory is provided with a plurality of holes for receiving a plurality of screws to attach the accessory to a surface.

Another aspect of the present invention is that the accessory has a lower face having a double-sided sticky pad applied thereon to attach the accessory to a surface.

Another aspect of the present invention is that the accessory has a lower face and the lower face has at least one non-slip element attached to the lower face to secure the accessory to a surface.

A method in accordance with the principles of the present invention includes a method of mounting a component in a plurality of selective orientations, the method including attaching a mounting accessory to a surface, inserting a protruding extension of the component into a corresponding orifice of the accessory, orienting the component between opposing portions of the mounting accessory, inserting a protrusion of the accessory into a depression of the component, changing the orientation of the component within the mounting accessory by overcoming a biasing force without removing the component from the accessory, wherein the component is resiliently and frictionally engaged between the opposing portions of the mounting accessory securing and attaching the component thereto.

Another method in accordance with the principles of the present invention includes a method of mounting a component in a plurality of selective orientations, the method including inserting a portion of the component into an orifice of a mounting accessory, inserting a portion of the mounting accessory into a depression of the component to obtain an initial orientation of the component within the mounting accessory; selectively changing the orientation of the component within the mounting accessory by overcoming a biasing force applied to the component by the accessory without removing the component from the mounting accessory, retaining the component securely within the mounting accessory in a selected orientation.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for mounting a component using a mounting accessory and wherein the mounting accessory and the component are designed and configured to provide a variety of different mounting methods, as required by the environment, and a variety of mating relationships between the mounting accessory and the component.

Further, once mounted within the mounting accessory in an initial orientation, the orientation of the component within the accessory is changeable without removal of the component from the accessory. The mounting accessory retains the component with resiliently biased portions that connect the component to the accessory in a mating fashion. The portions of the component and the accessory which interface also secure the component therein with a frictional engagement between the interfacing elements.

Figure 1:
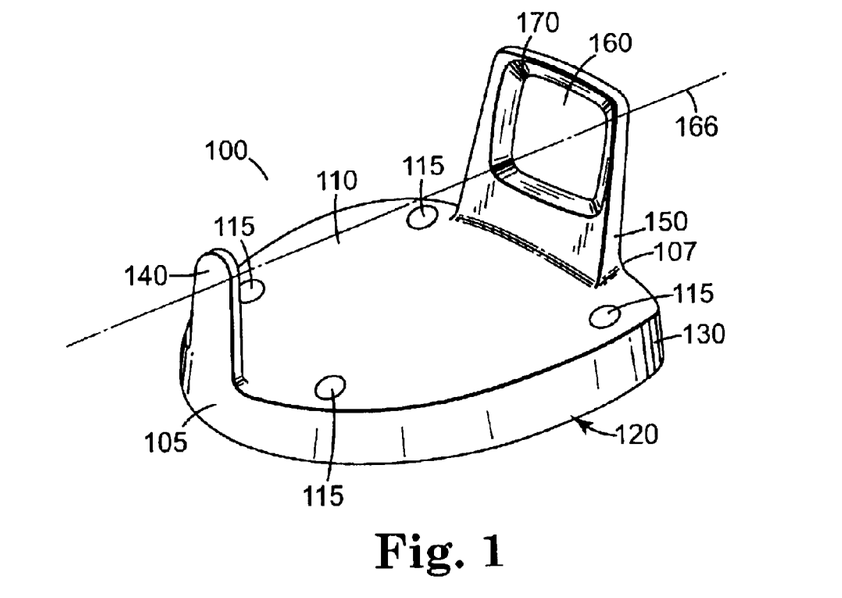
FIG. 1 illustrates a perspective view of a mounting accessory for mounting a component according to an embodiment of the present invention.

FIG. 1 illustrates a perspective view of the mounting accessory 100 for mounting a component according to an embodiment of the present invention. In FIG. 1, the mounting accessory 100 is shown having an upper face 110, a flange 130 extending downwardly from the upper face 110 and encircling the upper face 110. The mounting accessory 100 also includes a lower face or bottom portion 120.

The upper face 110 is shown in FIG. 1 provided with a plurality of holes 115. The holes 115 facilitate insertion and application of screws (not shown) to attach the mounting accessory 100 to a surface. The mounting accessory 100 is also shown provided with an arm 140 extending and protruding upwardly from the upper face 110 along a front end 105 of the mounting accessory 100. At a rear end 107 of the mounting accessory 100, a flange bracket 150 is shown extending and protruding upwardly from the upper face 110 of the mounting accessory 100.

The flange bracket 150 is provided with a generally square shaped orifice 160. The orifice 160 additionally being formed having a beveled flange 170 which encircles and forms an interior edge of the orifice 160. Arm 140 and flange bracket 150 are designed and configured to cooperatively and matingly connect, attach and mount an electrical component therebetween, and thus to the mounting accessory 100. The electrical component is retained within the mounting accessory 100 through biasing forces applied to the component by the arm 140 and the flange bracket 150 and also through frictional forces of the interacting surfaces of the electrical component and the arm 140 and flange bracket 150 of the mounting accessory 100.

The mounting accessory 100 including the arm 140 and the flange bracket 150 are fabricated from a resilient plastic material. The arm 140 and the flange bracket 150 are capable of resilient movement and provide a biasing force on the electrical component mounted therebetween. The resilient nature of the arm 140 and the flange bracket 150 allows an electrical component to be selectively orientable within the mounting accessory, that is, once mounted in the mounting accessory in an initially selected orientation, the electrical component may be turned to a another desired orientation without removing the electrical component from the mounting accessory along the axis of rotation 166 (also indicated as 266, 466, 566, 767, 1366, 1466 and 1566 in succeeding figures). Although the flange bracket 150 has been shown here as being generally square shaped, the flange bracket may be any shape provided that the flange bracket is able to mate with a corresponding member of the electrical device or component.

Figure 2:
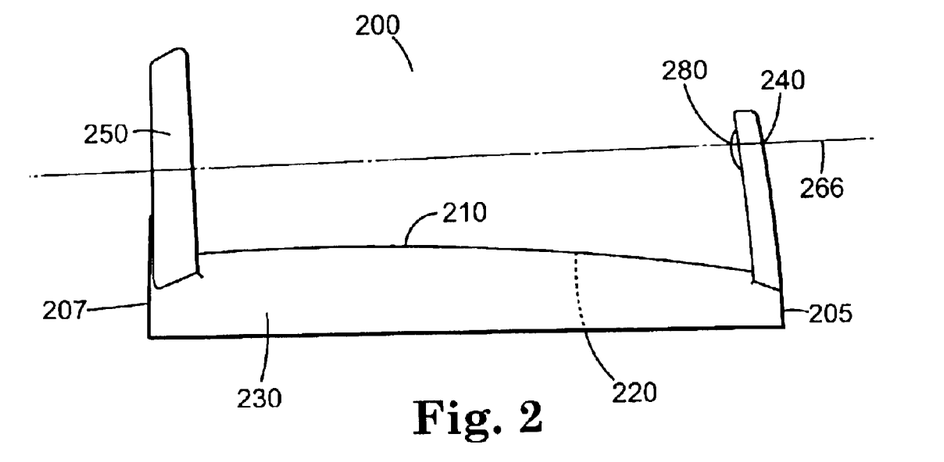
FIG. 2 illustrates a side view of a mounting accessory for mounting a component according to an embodiment of the present invention.

FIG. 2 illustrates a side view of the mounting accessory 200 for mounting a component according to an embodiment of the present invention. In FIG. 2, the mounting accessory 200 is shown having an upper face 210, a flange 230 extending downwardly from the upper face 210 and encircling the upper face 210. The mounting accessory 200 also includes a lower face or bottom portion 220.

The mounting accessory 200 is also shown provided with an arm 240 extending and protruding upwardly from the upper face 210 along a front end 205 of the mounting accessory 200. The arm 240 is shown provided with a generally hemispherical securing protrusion 280 which is designed and configured to matingly protrude into a corresponding hemispherical depression formed into a front end of an electrical component, as described below with reference to at least FIGS. 7, 8 and 12. Although the securing protrusion 280 is shown being hemispherically shaped, the securing protrusion may be any shape provided that the protrusion is able to mate with a corresponding member of the component or electrical device.

At a rear end 207 of the mounting accessory 200, a flange bracket 250 is shown extending and protruding upwardly from the upper face 210 of the mounting accessory 200. Arm 240 and flange bracket 250 are designed and configured to cooperatively and matingly connect, attach and mount an electrical component therebetween, and thus to the mounting accessory 200.

Figure 3:
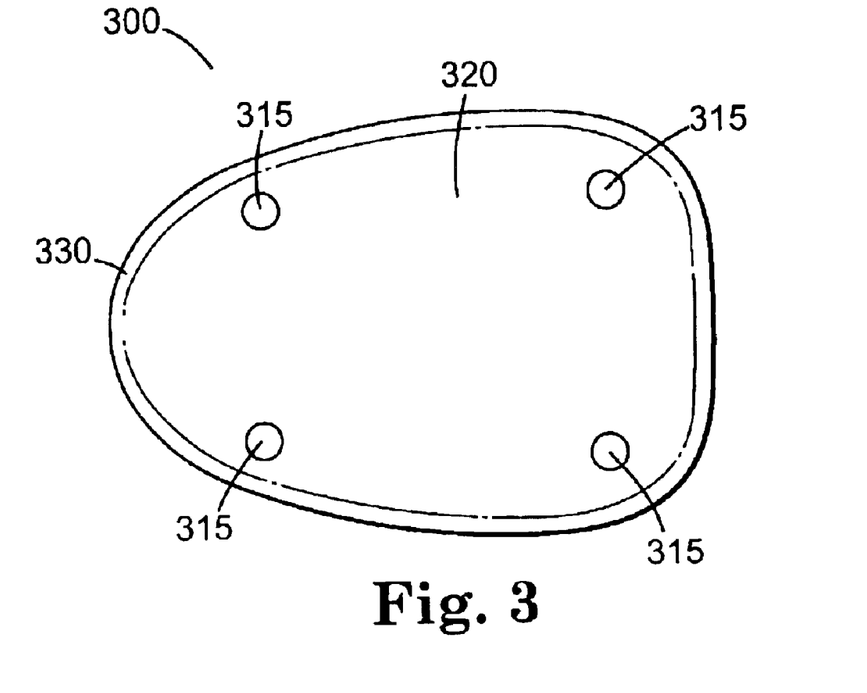
FIG. 3 illustrates a view of the bottom of a mounting accessory for mounting a component according to an embodiment of the present invention.

FIG. 3 illustrates a view of the bottom of the mounting accessory 300 for mounting a component according to an embodiment of the present invention. In FIG. 3, the lower face or bottom portion 320 is shown provided with a plurality of screw holes 315 therein. The screw holes 315 in the lower face 320 are shown encircled and enclosed by the flange 330 thus allowing an additional bracket (not shown) to be used to attach the mounting accessory 300 to a surface.

Figure 4:
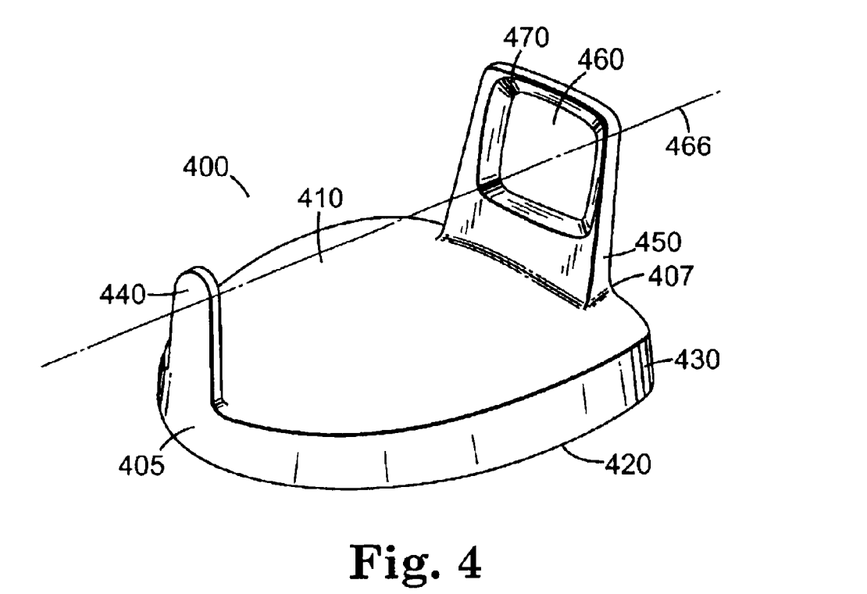
FIG. 4 illustrates a perspective view of a mounting accessory for mounting a component according to an embodiment of the present invention.

FIG. 4 illustrates a perspective view of the mounting accessory 400 for mounting a component according to an embodiment of the present invention. In FIG. 4, the mounting accessory 400 is shown having an upper face 410, a flange 430 extending downwardly from the upper face 410 and encircling the upper face 410. The mounting accessory 400 also includes a lower face or bottom portion 420.

The mounting accessory 400 is also shown provided with an arm 440 extending and protruding upwardly from the upper face 410 along a front end 405 of the mounting accessory 400. At a rear end 407 of the mounting accessory 400, a flange bracket 450 is shown extending and protruding upwardly from the upper face 410 of the mounting accessory 400. The flange bracket 450 is provided with a generally square shaped orifice 460. The orifice 460 additionally being formed having a beveled flange 470 which encircles and forms an interior edge of the orifice 460.

Arm 440 and flange bracket 450 are designed and configured to cooperatively and matingly connect, attach and mount an electrical component therebetween, and thus to the mounting accessory 400. The electrical component is retained within the mounting accessory 400 through biasing forces applied to the component by the arm 440 and the flange bracket 450 and also through frictional forces of the interacting surfaces of the electrical component and the arm 440 and flange bracket 450 of the mounting accessory 400.

The mounting accessory 400 including the arm 440 and the flange bracket 450 are fabricated from a resilient plastic material. The arm 440 and the flange bracket 450 are capable of movement and provide a biasing force on the electrical component mounted therebetween. The resilient nature of the arm 440 and the flange bracket 450 allows an electrical component to be selectively orientable within the mounting accessory 400, that is, once mounted in the mounting accessory 400 in an initially selected orientation, the electrical component may be turned to another desired orientation without removing the electrical component from the mounting accessory 400. Although the flange bracket 450 has been shown here as being generally square shaped, the flange bracket may be any shape provided that the flange bracket is able to mate with a corresponding member of the electrical device or component.

Figure 5:
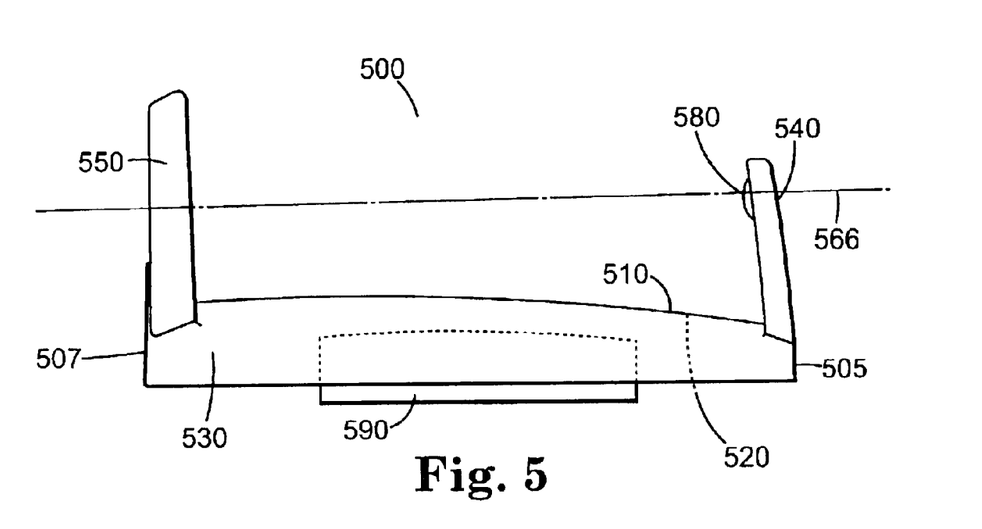
FIG. 5 illustrates a side view of a mounting accessory for mounting a component according to an embodiment of the present invention.
Figure 6:
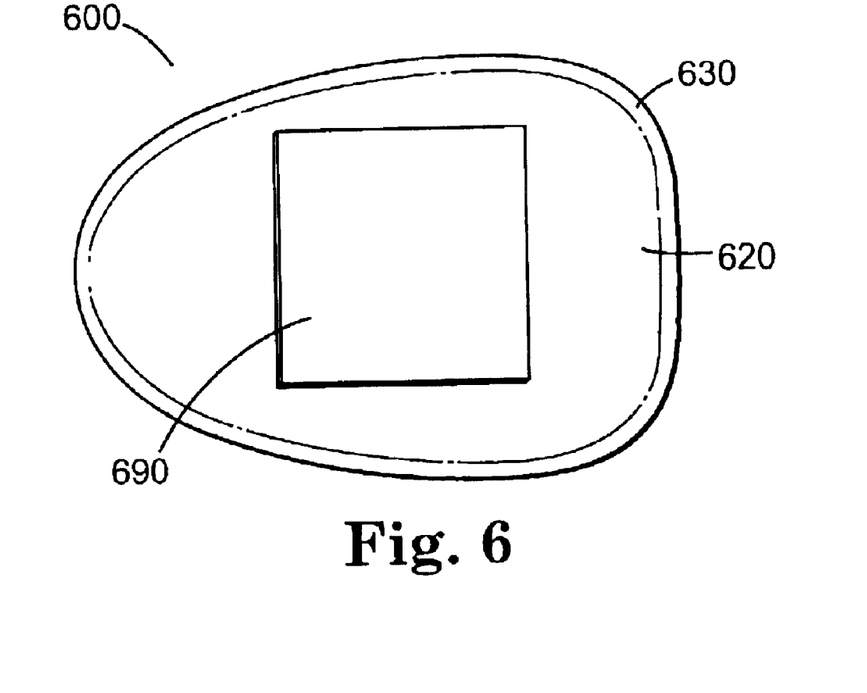
FIG. 6 illustrates a view of the bottom of a mounting accessory for mounting a component according to an embodiment of the present invention.
Figure 6A:
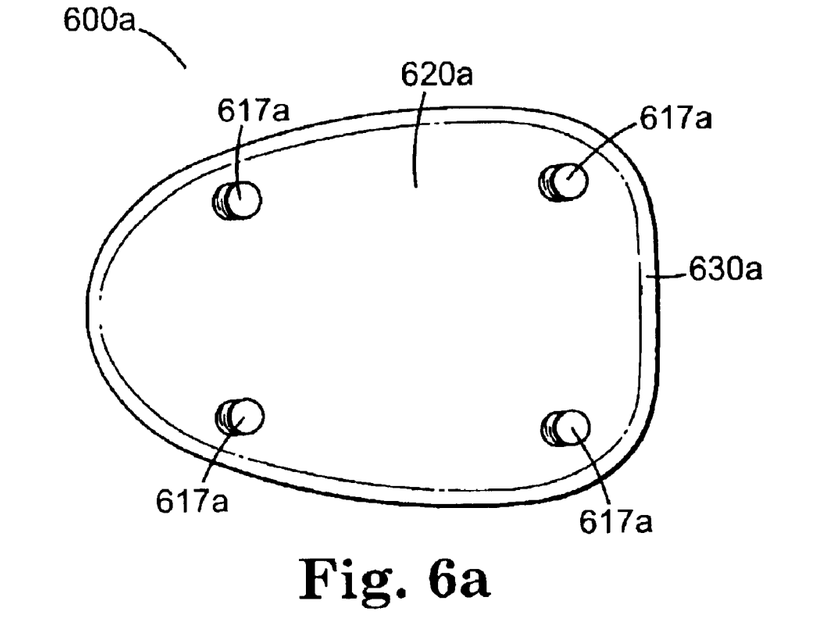
FIG. 6a illustrates a view of the bottom of a mounting accessory for mounting a component according to an embodiment of the present invention.
Figure 6B:
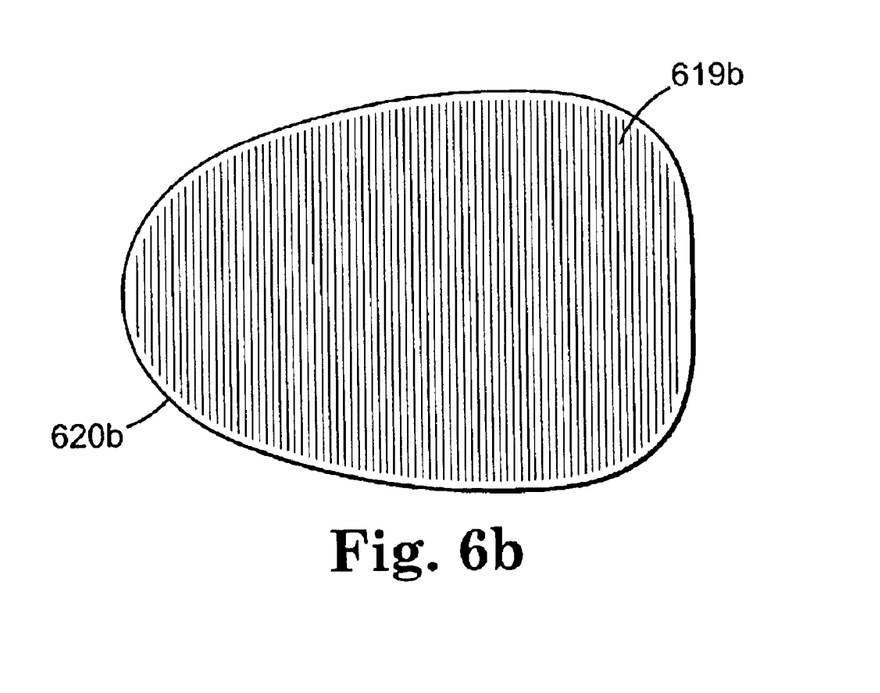
FIG. 6b illustrates a view of the bottom of a mounting accessory for mounting a component according to an embodiment of the present invention.

The mounting accessory 400 may be attached to a surface through application of a sticky pad 590 as illustrated in FIG. 5 or alternatively, stand on a table or shelf, being provided with non slip feet 617a, as illustrated in FIG. 6a, or a non slip rubber pad 619b, as illustrated in FIG. 6b, respectively described below.

FIG. 5 illustrates a side view of the mounting accessory 500 for mounting a component according to an embodiment of the present invention. In FIG. 5, the mounting accessory 500 is shown including an upper face 510, a flange 530 extending downwardly from the upper face 510 and encircling the upper face 510. The mounting accessory 500 also includes a lower face or bottom portion 520. Secured to the bottom portion or lower face 520 is a double sided sticky pad 590 that allows the mounting accessory 500 to be secured to a surface where use of screws are inadmissible or impractical.

The mounting accessory 500 is also shown provided with an arm 540 extending and protruding upwardly from the upper face 510 along a front end 505 of the mounting accessory 500. The arm 540 is shown provided with a generally hemispherical securing protrusion 580 which is designed and configured to matingly protrude into a corresponding hemispherical depression formed into a front end of an electrical component, as described below with reference to at least FIGS. 7, 8 and 12. Although the securing protrusion 580 is shown being hemispherically shaped, the securing protrusion may be any shape, provided that the protrusion is able to mate with a corresponding member of the component or electrical device.

At a rear end 507 of the mounting accessory 500, a flange bracket 550 is shown extending and protruding upwardly from the upper face 510 of the mounting accessory 500. Arm 540 and flange bracket 550 are designed and configured to cooperatively and matingly connect, attach and mount an electrical component therebetween, and thus to the mounting accessory 500.

FIG. 6 illustrates a view of the bottom of the mounting accessory 600 for mounting a component according to an embodiment of the present invention. In FIG. 6, the lower face 620 is shown with a double sided sticky pad 690 attached thereto permitting attachment of the mounting accessory 600 to a surface. The sticky pad 690 is shown encircled and enclosed by the flange 630 to attach the mounting accessory 600 to a surface.

FIG. 6a illustrates a view of the bottom of the mounting accessory 600a for mounting a component according to an embodiment of the present invention. In FIG. 6a, the lower face or bottom portion 620a of the mounting accessory 600a is shown provided with a plurality of non slip feet 617a. The non slip feet 617a allow the mounting accessory 600a to be placed securely on a table or a shelf when other attachment methods are impractical or inadmissible. In this embodiment, the flange 630a provides a skirt around the lower face 620a hiding the non slip feet 617a from view.

FIG. 6b illustrates a view of the bottom of the mounting accessory 600b for mounting a component according to an embodiment of the present invention. In FIG. 6b, the lower face 620b of the mounting accessory 600b is completely covered by a rubber pad 619b that is sized and configured to correspond to the shape of the mounting accessory. The rubber pad 619b provides another non slip surface that allows the mounting accessory 600b to be placed on a table or a shelf when other attachment methods are impractical or inadmissible.

Figure 7:
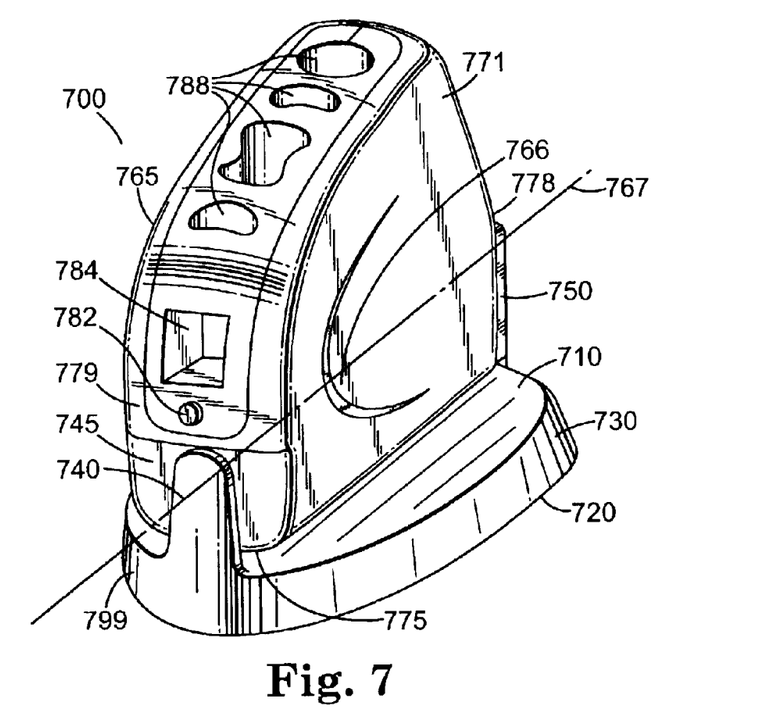
FIG. 7 illustrates a perspective view along the front end of a component mounted into a mounting accessory according to an embodiment of the present invention.

FIG. 7 illustrates a perspective view of the mounting system 700 along the front end of the component mounted into the mounting accessory according to an embodiment of the present invention. In FIG. 7, an electrical component 771 is shown mounted into the mounting accessory 799. The mounting accessory 799 is shown provided with an upper face 710, a flange 730 and a bottom portion or lower face 720.

The component 771 may make contact with the mounting accessory 799 in plural locations in this embodiment of the mounting method. The bottom 775 of the component 771 may make contact with the upper face 710 of the mounting accessory 799. The arm 740 of the mounting accessory 799 makes contact with a generally flat connecting surface 745 located at a front end 779 of the component 771. The hemispherical protrusion makes mating contact with the hemispherical depression. The flange bracket 750 of the mounting accessory 799 also makes contact with the rear end 778 of the component 771. The generally square shaped orifice of the accessory makes mating contact with the generally square shaped protruding extension of the component (not shown in FIG. 7). The beveled surfaces of the interior of the orifice make mating contact with the beveled surfaces of the exterior of the protruding extension (not shown in FIG. 7).

By way of example, the component 771 is shown provided with a plurality of buttons 788, a cable connecting orifice 784 and a cable releasing button 782. The buttons and other elements of the component disclosed in FIG. 7 are identical throughout all the remaining figures and therefore will not be repeated in the discussion below.

In FIG. 7, a mounting method for mounting the component 771 into the mounting accessory 799 such that the upper face 710 of the mounting accessory 799 is generally parallel with the bottom 775 of the component 771 is illustrated. Sides 765 and 766 of the component 771 are shown generally perpendicular to the upper face 710 of the mounting accessory 799. The mounting system 700 applied according to this method may be placed upon a table, a desktop or a shelf, mounted to a floor, a ceiling or a wall. Selection of a particular orientation of the component within the mounting accessory is a matter of convenience for the user. The component should preferably be mounted in the mounting accessory to provide the easiest access possible of a user to the buttons located on the electrical component. As described earlier, the orientation of the component within the mounting accessory may conveniently and easily changed by turning the component within the mounting accessory without removal therefrom.

Figure 8:
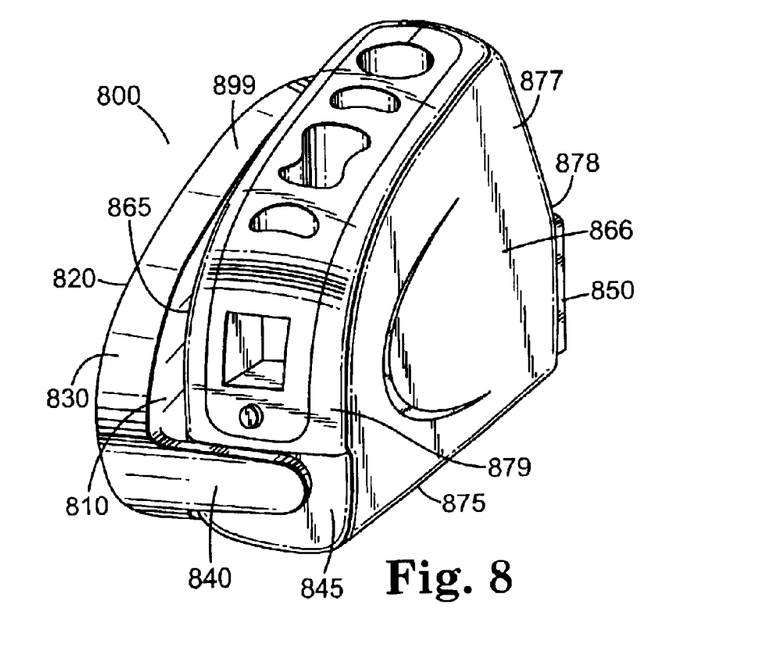
FIG. 8 illustrates a perspective view along the front end of a component mounted into a mounting accessory according to an embodiment of the present invention.

FIG. 8 illustrates a perspective view of the mounting system 800 along the front end of the component mounted into the mounting accessory according to an embodiment of the present invention. In FIG. 8, the component 877, having a rear end 878, is shown mounted into the mounting accessory 899 in another manner. The mounting accessory 899 is shown including an upper face 810, a flange 830, a bottom portion 820, an arm 840 and a flange bracket 850. The component 877 is shown including a generally flat bottom 875, parallel sides 865 and 866 and along the front end, a generally flat connecting surface 845.

The component 877 may make contact with the mounting accessory 899 in plural locations in this embodiment of the mounting method. A side 865 or 866 of the component 877 may make contact with the upper face 810 of the mounting accessory 899. The arm 840 of the mounting accessory 899 makes contact with the generally flat connecting surface 845 located at a front end 879 of the component 877. The hemispherical protrusion makes mating contact with the hemispherical depression. The flange bracket 850 of the mounting accessory 899 also makes contact with the rear end 878 of the component 877. The generally square shaped orifice of the accessory makes mating contact with the generally square shaped protruding extension of the component (not shown in FIG. 8). The beveled surfaces of the interior of the orifice make mating contact with the beveled surfaces of the exterior of the protruding extension (not shown in FIG. 8).

In FIG. 8, a mounting method for mounting the component 877 into the mounting accessory 899 such that the upper face 810 of the mounting accessory 899 is generally perpendicular to the bottom 875 of the component 877 is illustrated. Sides 865 and 866 of the component 877 are shown generally parallel to the upper face 810 of the mounting accessory 899. The mounting system 800 applied according to this method may be placed upon a table, a desktop or a shelf, mounted to a floor, a ceiling or a wall. Selection of a particular orientation of the component within the mounting accessory is a matter of convenience for the user. The component should preferably be mounted in the mounting accessory to provide the easiest access possible of a user to the buttons located on the electrical component. As described earlier, the orientation of the component within the mounting accessory may conveniently and easily changed by turning the component within the mounting accessory without removal therefrom.

Figure 9:
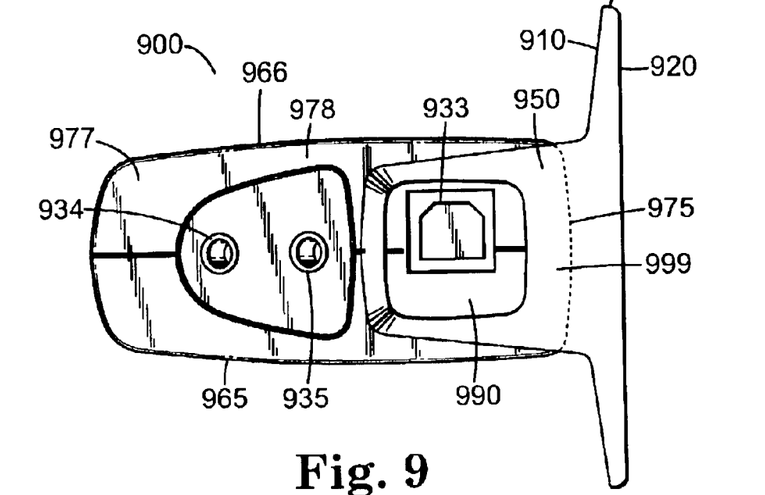
FIG. 9 illustrates a rear end view of a component mounted into a mounting accessory according to an embodiment of the present invention.

FIG. 9 illustrates a rear end view of the mounting system 900 showing the component mounted into the mounting accessory according to an embodiment of the present invention. In FIG. 9, an electrical component 977 is shown mounted into the mounting accessory 999. The mounting accessory 999 is shown provided with an upper face 910, a flange 930 and a bottom portion or lower face 920.

The component 977, having an extension 990, may make contact with the mounting accessory 999 in plural locations in this embodiment of the mounting method. The bottom 975 of the component 977 may make contact with the upper face 910 of the mounting accessory 999. The arm (not shown in FIG. 9) of the mounting accessory 999 makes contact with a generally flat connecting surface (not shown in FIG. 9) located at a front end of the component 977. The hemispherical protrusion makes mating contact with the hemispherical depression (not shown in FIG. 9). The flange bracket 950 of the mounting accessory 999 also makes contact with the rear end 978 of the component 977. The generally square shaped orifice of the accessory makes mating contact with the generally square shaped protruding extension of the component. The beveled surfaces of the interior of the orifice make mating contact with the beveled surfaces of the exterior of the protruding extension.

The component 977 is also shown provided on the rear end 978 a network cable receiving orifice 933, a speaker plug receiving orifice 934 and a microphone receiving orifice 935. These elements are identical in the other figures disclosed below and therefore will not be mentioned again.

In FIG. 9, a mounting method for mounting the component 977 into the mounting accessory 999 such that the upper face 910 of the mounting accessory 999 is generally parallel with the bottom 975 of the component 977 is illustrated. Sides 965 and 966 of the component 977 are shown generally perpendicular to the upper face 910 of the mounting accessory 999. The mounting system 900 applied according to this method may be placed upon a table, a desktop or a shelf, mounted to a floor, a ceiling or a wall. Selection of a particular orientation of the component within the mounting accessory is a matter of convenience for the user. The component should preferably be mounted in the mounting accessory to provide the easiest access possible of a user to the buttons located on the electrical component. As described earlier, the orientation of the component within the mounting accessory may conveniently and easily changed by turning the component within the mounting accessory without removal therefrom.

Figure 10:
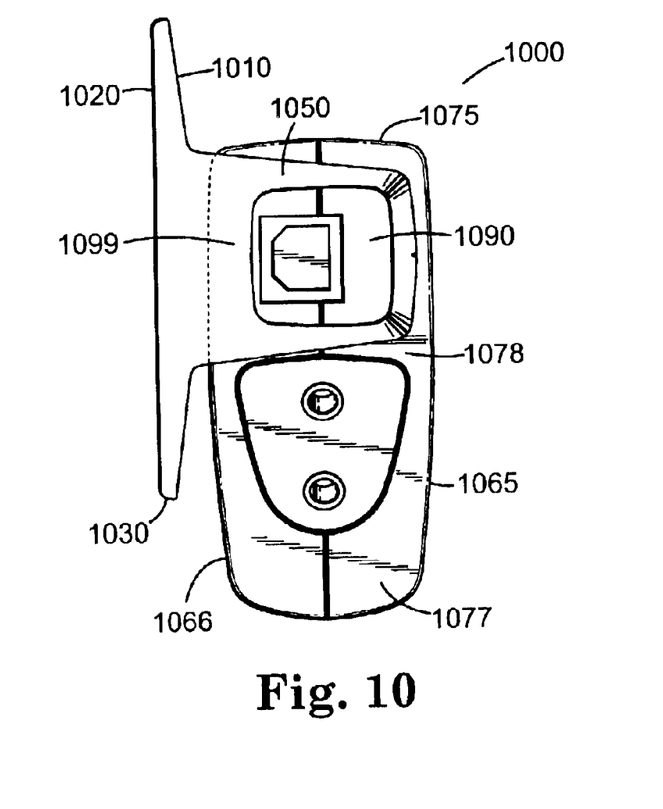
FIG. 10 illustrates a rear end view of a component mounted into a mounting accessory according to an embodiment of the present invention.

FIG. 10 illustrates a rear end view of the mounting system 1000 showing the component mounted into the mounting accessory according to an embodiment of the present invention. In FIG. 10, the component 1077, having extension 1090, is shown mounted into the mounting accessory 1099 in another manner. The mounting accessory 1099 is shown including an upper face 1010, a flange 1030, a bottom portion 1020, an arm (not shown in FIG. 10) and a flange bracket 1050. The component 1077 is shown including a generally flat bottom 1075, parallel sides 1065 and 1066 and along the front end a generally flat connecting surface (not shown in FIG. 10).

The component 1077 may make contact with the mounting accessory 1099 in plural locations in this embodiment of the mounting method. A side 1066 or 1065 of the component 1077 may make contact with the upper face 1010 of the mounting accessory 1099. The arm (not shown in FIG. 10) of the mounting accessory 1099 makes contact with the generally flat connecting surface (not shown in FIG. 10).

The component 1077 may make contact with the mounting accessory 1099 in plural locations in this embodiment of the mounting method. A side 1066 or 1065 of the component 1077 may make contact with the upper face 1010 of the mounting accessory 1099. The arm (not shown in FIG. 10) of the mounting accessory 1099 makes contact with the generally flat connecting surface (not shown in FIG. 10) located at a front end of the component 1077. The hemispherical protrusion make mating contact with the hemispherical depression (not shown in FIG. 10). The flange bracket 1050 of the mounting accessory 1099 also makes contact with the rear end 1078 of the component 1077. The generally square shaped orifice of the accessory makes mating contact with the generally square shaped protruding extension of the component. The beveled surfaces of the interior of the orifice make mating contact with the beveled surfaces of the exterior of the protruding extension.

In FIG. 10, a mounting method for mounting the component 1077 into the mounting accessory 1099 such that the upper face 1010 of the mounting accessory 1099 is generally perpendicular to the bottom 1075 of the component 1077 is illustrated. Sides 1065 and 1066 of the component 1077 are shown generally parallel to the upper face 1010 of the mounting accessory 1099. The mounting system 1000 applied according to this method may be placed upon a table, a desktop or a shelf, mounted to a floor, a ceiling or a wall. Selection of a particular orientation of the component within the mounting accessory is a matter of convenience for the user. The component should preferably be mounted in the mounting accessory to provide the easiest access possible of a user to the buttons located on the electrical component. As described earlier, the orientation of the component within the mounting accessory may conveniently and easily changed by turning the component within the mounting accessory without removal therefrom.

Figure 11:
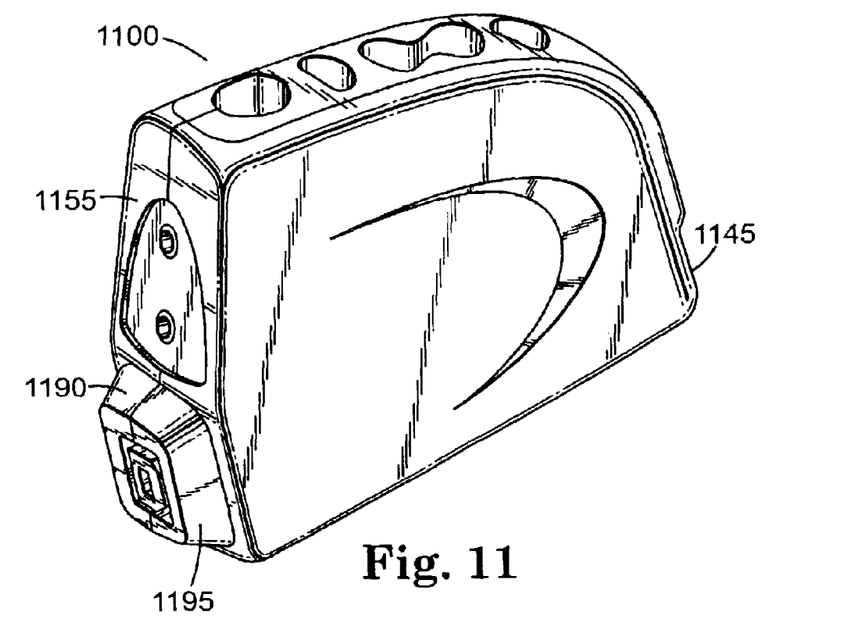
FIG. 11 illustrates a perspective view of a component for mounting into a mounting accessory according to an embodiment of the present invention.

FIG. 11 illustrates a perspective view along the rear end of the component 1100 before mounting the component into the mounting accessory according to an embodiment of the present invention. In FIG. 11, the rear end 1155 of the component 1100 is shown including a generally square shaped protruding extension 1190. The protruding extension is designed and configured to be received into the orifice of the flange bracket of the mounting accessory disclosed in the previous Figs. The protruding extension 1190 is provided with a beveled edge surfaces 1195 which is designed and configured to matingly fit into the beveled flange portions of the flange brackets as shown in FIGS. 1 and 4.

More particularly, the protruding extension 1190 is generally square shaped and the orifice of the flange bracket of the mounting accessory is also generally square shaped. The protruding extension 1190 and the flange bracket orifice are designed and configured to matingly fit together allowing the component 1100 to be attached to the mounting accessory in the variety of manners disclosed herein. The generally flat connecting surface 1145 is shown in FIG. 11, but will be more clearly described below with regard to FIG. 12. Although both the protruding extension and the flange bracket are shown being generally square shaped, they may be any other shape provided that the protruding extension and the flange bracket matingly fit together for attachment thereto.

Figure 11A:
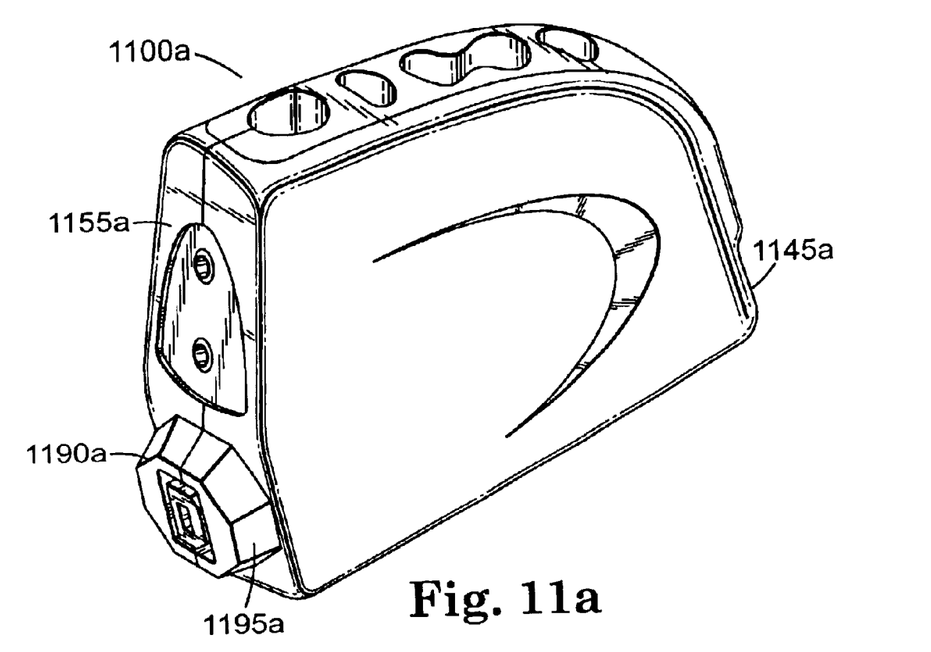
FIG. 11a illustrates a perspective view of a component for mounting into a mounting accessory according to an embodiment of the present invention.

FIG. 11a illustrates a perspective view along the rear end of the component 1100a before mounting the component into the mounting accessory according to an embodiment of the present invention. In FIG. 11a, the rear end 1155a of the component 1100a is shown including a generally octagonal shaped protruding extension 1190a. The protruding extension 1190a is designed and configured to be received into the orifice of the flange bracket of the mounting accessory disclosed in the previous Figs. The protruding extension 1190a is provided with a eight beveled edge surfaces 1195a which are designed and configured wherein at least four of the beveled edge surfaces matingly fit into the beveled flange portions of the flange brackets as shown in FIGS. 1 and 4.

More particularly, the protruding extension 1190a is generally octagonal shaped and the orifice of the flange bracket of the mounting accessory is generally square shaped. The protruding extension 1190a and the flange bracket orifice are designed and configured wherein at least four exterior forming beveled edge surfaces of the eight exterior forming beveled edge surfaces 1195a matingly fit together with the four interior forming beveled edge surfaces of the flange bracket orifice allowing the component 1100a to be attached to the mounting accessory in a variety selectable orientations as illustrated below in FIG. 11b. The generally flat connecting surface 1145a is shown in FIG. 11a, but will be more clearly described below with regard to FIG. 12. Although the protruding extension in this embodiment is shown having eight exterior forming beveled edge surfaces and the orifice of the flange bracket has four interior forming beveled edge surfaces in the flange bracket, the protruding extension may have more edge surfaces, for example, twelve, sixteen, twenty or more surfaces providing greater orientation selectability while still securely mating together the component and the mounting accessory. In another embodiment, the protruding extension may be generally triangular and the corresponding orifice may also be generally triangular to provide a selectable orientation.

Figure 11B:
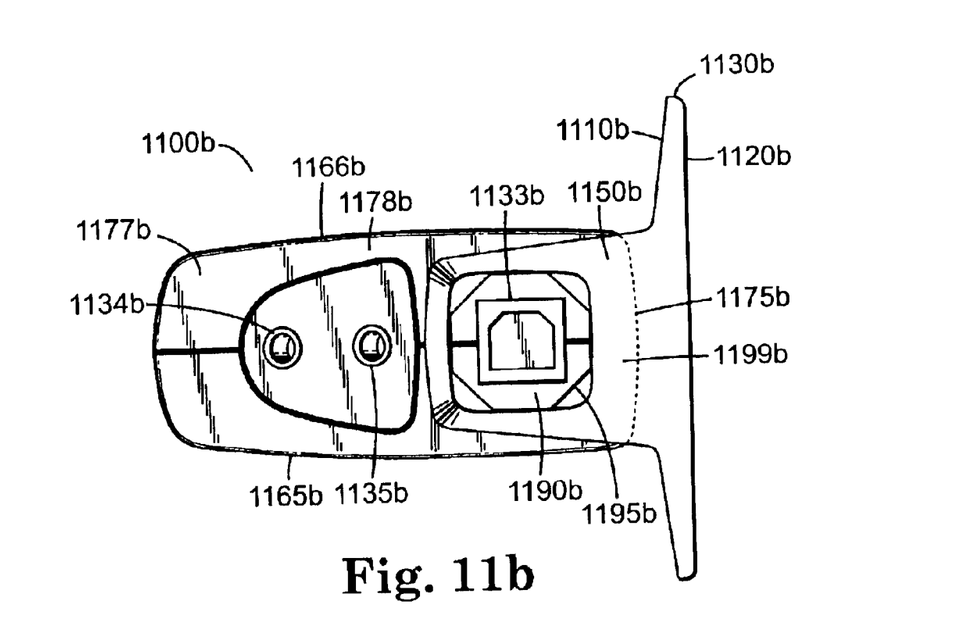
FIG. 11b illustrates a rear end view of a component mounted into a mounting accessory according to an embodiment of the present invention.

FIG. 11b illustrates a rear end view of the mounting system 1100b showing the component mounted into the mounting accessory according to an embodiment of the present invention. In FIG. 11b, an electrical component 1177b is shown mounted into the mounting accessory 1199b. The mounting accessory 1199b is shown provided with an upper face 1110b, a flange 1130b and a bottom portion or lower face 1120b.

The component 1177b may make contact with the mounting accessory 1199b in plural locations in this embodiment of the mounting method. The bottom 1175b of the component 1177b may make contact with the upper face 1110b of the mounting accessory 1199b. The arm (not shown in FIG. 11b) of the mounting accessory 1199b makes contact with a generally flat connecting surface (not shown in FIG. 11b) located at a front end of the component 1177b. The hemispherical protrusion makes mating contact with the hemispherical depression (not shown in FIG. 11b). The flange bracket 1150b of the mounting accessory 1199b also makes contact with the rear end 1178b of the component 1177b. The generally square shaped orifice of the accessory makes mating contact with the generally octagonal shaped protruding extension of the component. The four beveled surfaces of the interior of the orifice make mating contact with at least four of the eight beveled surfaces 1195b of the exterior of the protruding extension 1190b.

The component 1177b is also shown provided on the rear end 1178b with a network cable receiving orifice 1133b, a speaker plug receiving orifice 1134b and a microphone receiving orifice 1135b. These elements are identical in the other figures disclosed below.

In FIG. 11b, a mounting method for mounting the component 1177b into the mounting accessory 1199b such that the upper face 1110b of the mounting accessory 1199b is generally parallel with the bottom 1175b of the component 1177b is illustrated. Sides 1165b and 1166b of the component 1177b are shown generally perpendicular to the upper face 1110b of the mounting accessory 1199b. The mounting system 1100b applied according to this method may be placed upon a table, a desktop or a shelf, mounted to a floor, a ceiling or a wall. Selection of a particular orientation of the component within the mounting accessory is a matter of convenience for the user. The component should preferably be mounted in the mounting accessory to provide the easiest access possible of a user to the buttons located on the electrical component. As described earlier, the orientation of the component within the mounting accessory may conveniently and easily changed by turning the component within the mounting accessory without removal therefrom.

Figure 12:
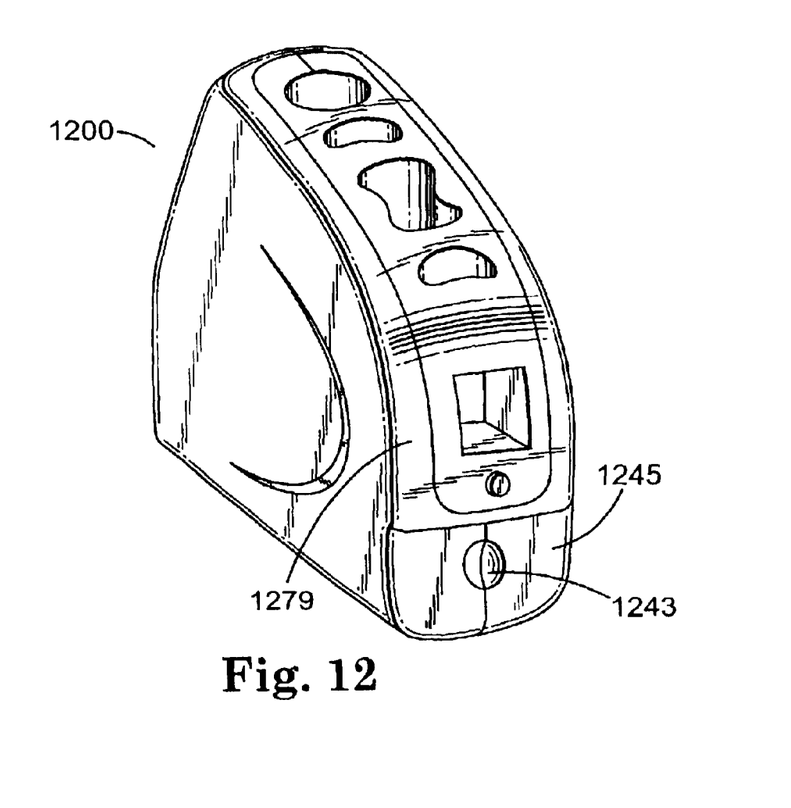
FIG. 12 illustrates a perspective view of a component for mounting into a mounting accessory according to an embodiment of the present invention.

FIG. 12 illustrates a perspective view along the front end of the component 1200 for mounting into the mounting accessory according to an embodiment of the present invention. In FIG. 12, the front end 1279 of the component 1200 is shown provided with a generally flattened surface 1245 which is provided with a hemispherical depression 1243. The generally flattened surface 1245 and the hemispherical depression 1243 are designed and configured to matingly fit together with the arm and the hemispherical securing protrusion provided on the arm as shown in FIGS. 2 and 5.

The arm and flattened surface fit together in a variety of arrangements permitting a plurality of selectable orientation for the component within the accessory. The hemispherical protrusion and hemispherical depression also fit together in a variety of different arrangements. Although the protrusion and depression are shown being hemispherically shaped, they may be any other shape provided that they are able to matingly fit together for attachment thereto.

Figure 13:
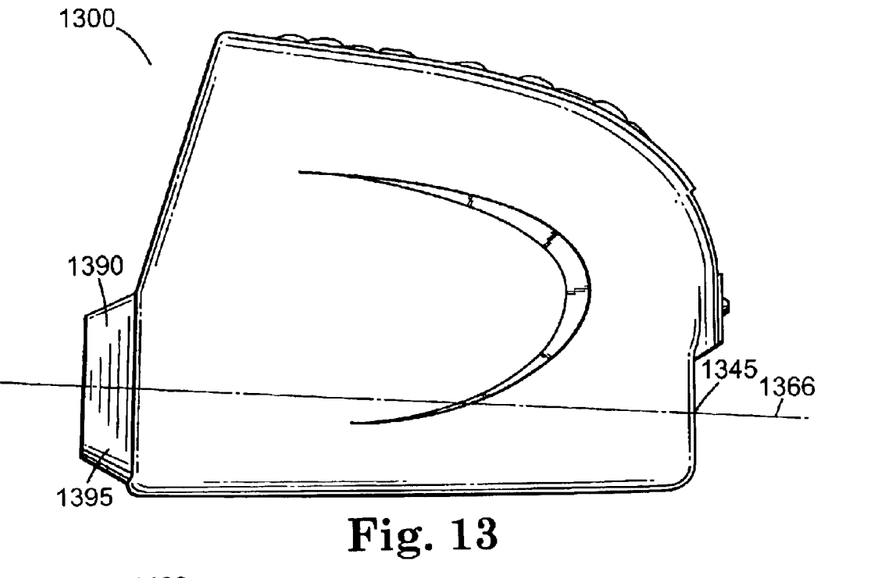
FIG. 13 illustrates a side view of a component for mounting into a mounting accessory according to an embodiment of the present invention.

FIG. 13 illustrates a side view of the component 1300 for mounting into the mounting accessory according to an embodiment of the present invention. In FIG. 13, the component is shown provided with a generally flattened surface 1345 designed and configured to matingly attach the arm of the mounting accessory at a front end and a generally square shaped protruding extension 1390 at a rear end. The protruding extension 1390 is designed and configured to be received into the orifice of the flange bracket of the mounting accessory disclosed in the previous Figs.

The protruding extension 1390 is provided with beveled edge surfaces 1395 which are designed and configured to matingly fit into the beveled flange portion of the flange bracket. The protruding extension 1390 is generally square shaped and the orifice of the flange bracket of the mounting accessory is also generally square shaped. The protruding extension 1390 and the flange bracket orifice are designed and configured to matingly fit together allowing the component 1300 to be attached to the mounting accessory in the variety of manners disclosed herein.

Figure 14:
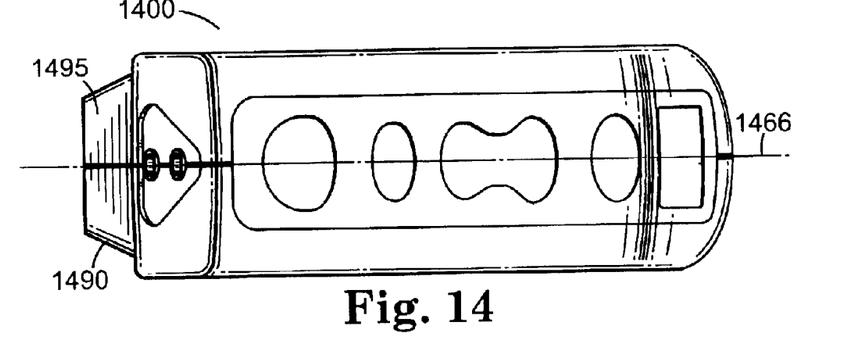
FIG. 14 illustrates a top view of a component for mounting into a mounting accessory according to an embodiment of the present invention.

FIG. 14 illustrates a top view of the component 1400 for mounting into the mounting accessory according to an embodiment of the present invention. In FIG. 14, the component 1400 is shown provided with a generally square shaped protruding extension 1490. The protruding extension 1490 is designed and configured to be received into the orifice of the flange bracket of the mounting accessory disclosed in the previous Figs.

The protruding extension 1490 is provided with a beveled edge 1495 which is designed and configured to matingly fit into the beveled flange portion of the flange bracket. The protruding extension 1490 is generally square shaped and the orifice of the flange bracket of the mounting accessory is also generally square shaped. The protruding extension 1490 and the flange bracket orifice are designed and configured to matingly fit together allowing the component to be attached to the mounting accessory in the variety of manners disclosed herein.

Figure 15:
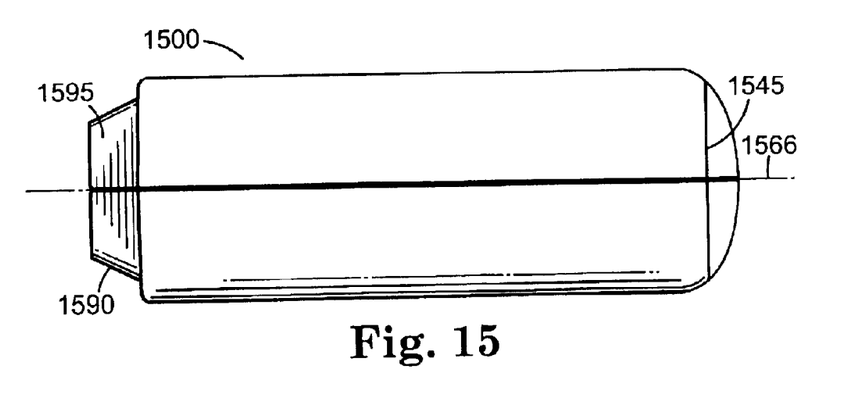
FIG. 15 illustrates a bottom view of a component for mounting into a mounting accessory according to an embodiment of the present invention.

FIG. 15 illustrates a bottom view of the component 1500 for mounting into the mounting accessory according to an embodiment of the present invention. In FIG. 15, the component is shown provided with a generally flattened surface 1545 designed and configured to matingly attach the arm of the mounting accessory at a front end and a generally square shaped protruding extension 1590 at a rear end. The protruding extension 1590 is designed and configured to be received into the orifice of the flange bracket of the mounting accessory disclosed in the previous Figs.

The protruding extension 1590 is provided with a beveled edge 1595 which is designed and configured to matingly fit into the beveled flange portion of the flange bracket. The protruding extension 1590 is generally square shaped and the orifice of the flange bracket of the mounting accessory is also generally square shaped. The protruding extension 1590 and the flange bracket orifice are designed and configured to matingly fit together allowing the component to be attached to the mounting accessory in the variety of manners disclosed herein.

Figure 16:
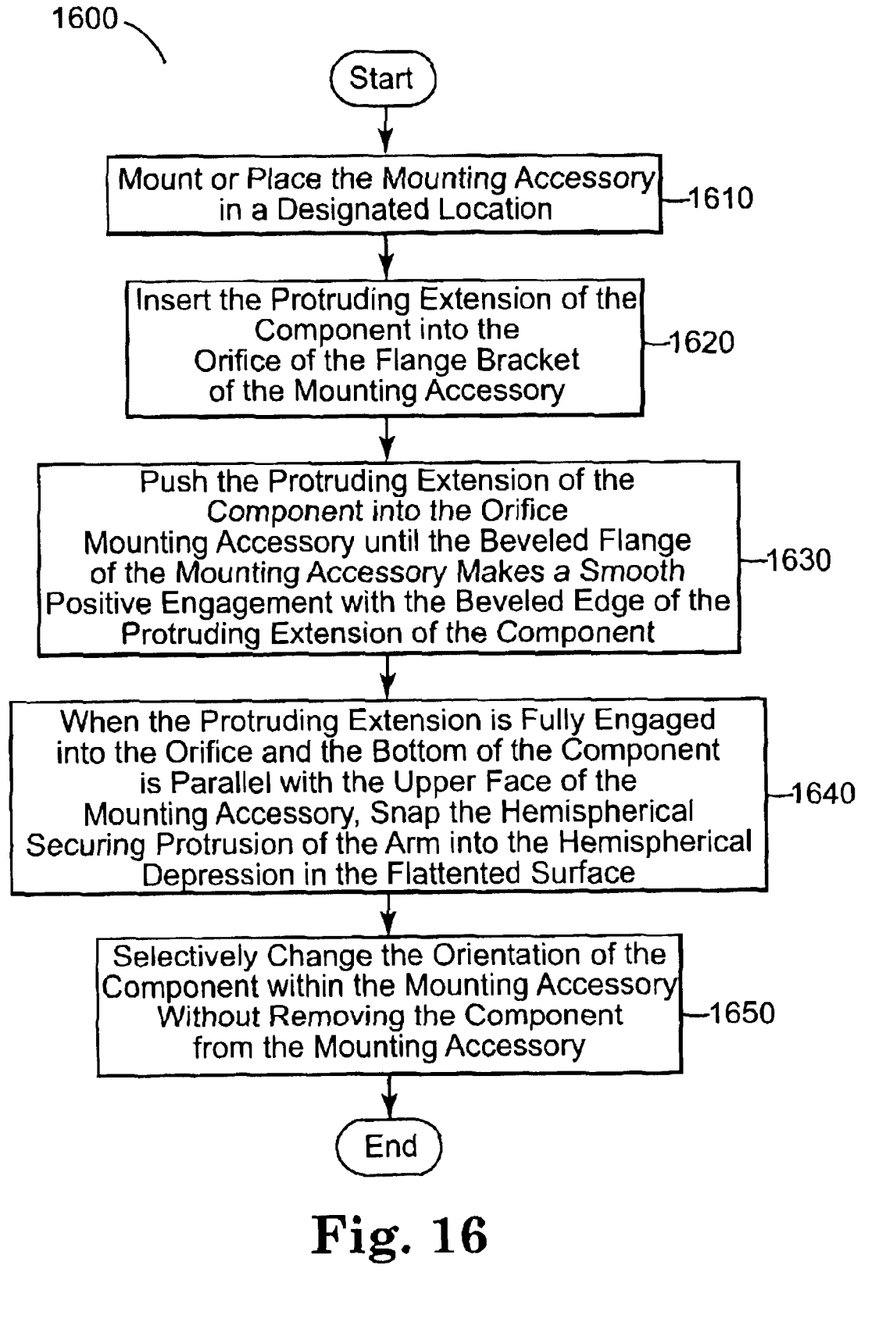
FIG. 16 is a flowchart illustrating a method of mounting a component using a mounting accessory according to an embodiment of the present invention.

FIG. 16 is a flowchart illustrating a method of mounting a component using a mounting accessory 1600 according to an embodiment of the present invention. In FIG. 16, the method may begin by mounting the mounting accessory in a designated location 1610. Using the embodiments disclosed, the mounting accessory may be mounted to a wall, a ceiling, a floor, a desktop or a shelf, etc. The mounting accessory may be secured to the designated surface with screws, a double-sided sticky pad, or the mounting accessory may simply rest on a desktop, table or shelf in a non-slip manner with non-slip feet, a non-slip pad or the mounting accessory may be secured with a sticky pad.

Once the mounting accessory is mounted or placed in a designated location, the component may now be attached to the mounting accessory. Mounting the component to the mounting accessory is initiated by inserting the protruding extension of the component into the orifice in the flange bracket of the mounting accessory 1620. The component may be turned and twisted to align the beveled surfaces of the generally square protruding extension with the beveled flange surfaces located interior of the orifice of the flange bracket. The corresponding surfaces of the protruding extension and the orifice are designed and configured to matingly fit together in a smooth and flush manner. The attachment of the component continues by pushing the protruding extension into the orifice of the mounting accessory until the beveled flange of the mounting accessory makes a smooth positive engagement with the beveled edge of the protruding extension of the component 1630.

When the protruding extension is fully engaged into the orifice, the beveled surfaces of the orifice of the accessory and the beveled edge surfaces of the protruding extension are all aligned respectively and mated together 1640. The bottom of the component may be generally parallel with the upper face of the mounting accessory and the sides of the communication device may be generally perpendicular to the upper face, the hemispherical securing protrusion located on the arm of the mounting accessory is snapped into the hemispherical depression located in the generally flattened surface located on the front of the component. The component is now securely attached within the mounting accessory. Reversing the procedure set forth above allows the component to be easily removed from the mounting accessory for cleaning or other maintenance as desired.

However, once connected into the accessory in an initial orientation, the orientation of the component within the accessory is changeable without removal of the component from the accessory 1650. Because the component is secured into the accessory with the resilient arm and flange bracket, the orientation of the component may be changed by turning the component in the accessory to a selected new orientation. When the component is turned within the accessory, the biasing force of the arm and the flange bracket is overcome and the component is turned to a new orientation.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A selectively positionable mounting system comprising:

a) a component element having first and second ends, said first end having a protruding multifaceted surface with a plurality of adjacent segmented edge surfaces and said second end having a pivoting mating surface;

b) a base accessory mounting and maintaining said component element in a plurality of selective orientations, the base accessory having a pair of spaced apart generally upstanding elements configured to receive said first and second ends of said component under resilient bias force, one of said elements having a pivoting mating surface configured to pivotally mate with said pivoting mating surface of said component element and the other of said elements having an orifice with a plurality of edge surfaces therein receiving said protruding multifaceted surface of said component element; and wherein at least a portion of the plurality of edge surfaces on the component element engage at least two of the edge surfaces of the orifice to facilitate mounting of the component element into the base accessory in said plurality of selective orientations, so that said component element may be rotated and positioned in said base accessory at a plurality of angular positions and positively maintained in one of said plurality of angular positions where surfaces of said component element engage surfaces of said base accessory under bias force; and whereby said upstanding elements are biased away from each other from a first to a second position when said component element moves from one selective orientation to another selective orientation.

2. The system of claim 1, wherein the orifice comprises a plurality of separate surface segments which form as a whole a substantially contiguous surface.

3. The system of claim 1 wherein said orifice is square shaped and has four beveled flanges forming an interior of the orifice.

4. The system of claim 1, wherein the orifice is generally square shaped and has four beveled flanges forming an interior of the orifice and the protruding surface has beveled flanges numbering a multiple of four forming an exterior of the protruding surface and further wherein the interior of the orifice and the four beveled flanges forming the exterior of the protruding surface resiliently mate together in a plurality of orientations.

5. A system according to claim 1, wherein said protruding surface forms a polygon and wherein at least two of said edge surfaces of said orifice can engage said polygon in different selectable orientations.

6. A system according to claim 5, wherein said plurality of edge surfaces of the orifice form an octagon and wherein at least two of said edge surfaces can engage said polygon in different selectable orientations.

* * * * *